(12) United States Patent
Chen et al.

(10) Patent No.: US 11,625,807 B2
(45) Date of Patent: Apr. 11, 2023

(54) LOW POWER AND LOW LATENCY GPU COPROCESSOR FOR PERSISTENT COMPUTING

(71) Applicant: Advanced Micro Devices, Inc., Santa Clara, CA (US)

(72) Inventors: Jiasheng Chen, Orlando, FL (US); Timour Paltashev, Santa Clara, CA (US); Alexander Lyashevsky, Santa Clara, CA (US); Carl Kittredge Wakeland, Santa Clara, CA (US); Michael J. Mantor, Orlando, FL (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/181,300

(22) Filed: Feb. 22, 2021

(65) Prior Publication Data

US 2021/0201439 A1 Jul. 1, 2021

Related U.S. Application Data

(63) Continuation of application No. 15/360,057, filed on Nov. 23, 2016, now Pat. No. 10,929,944.

(51) Int. Cl.
*G06T 1/20* (2006.01)
*G06F 9/54* (2006.01)
(Continued)

(52) U.S. Cl.
CPC ............. *G06T 1/20* (2013.01); *G06F 9/3887* (2013.01); *G06F 9/542* (2013.01); *G06T 1/60* (2013.01);
(Continued)

(58) Field of Classification Search
CPC . G06T 1/20; G06T 1/60; G06F 9/3887; G06F 9/542; G06F 2009/3883; G06F 2209/548
See application file for complete search history.

(56) References Cited

U.S. PATENT DOCUMENTS 5,999,200 A 12/1999 Harkin et al.
9,411,636 B1 8/2016 Ting et al.
(Continued)

FOREIGN PATENT DOCUMENTS

JP 2012505488 A 3/2012
JP 2013504127 A 2/2013
(Continued)

OTHER PUBLICATIONS

Soliman, Mostafa I., "Mat-Core: A Decoupled Matrix Core Extension for General-Purpose Processors", Neural, Parallel & Scientific Computations, Mar. 2011, pp. 91-110, vol. 19, Issue 1-2, Dynamic Publishers, Inc., https://www.researchgate.net/publication/267561251. [Retrieved on Sep. 30, 2018].
(Continued)

*Primary Examiner* — Terrell M Robinson
(74) *Attorney, Agent, or Firm* — Kowert Hood Munyon Rankin and Goetzel PC; Rory D. Rankin

(57) ABSTRACT

Systems, apparatuses, and methods for implementing a graphics processing unit (GPU) coprocessor are disclosed. The GPU coprocessor includes a SIMD unit with the ability to self-schedule sub-wave procedures based on input data flow events. A host processor sends messages targeting the GPU coprocessor to a queue. In response to detecting a first message in the queue, the GPU coprocessor schedules a first sub-task for execution. The GPU coprocessor includes an inter-lane crossbar and intra-lane biased indexing mechanism for a vector general purpose register (VGPR) file. The VGPR file is split into two files. The first VGPR file is a larger register file with one read port and one write port. The
(Continued)

second VGPR file is a smaller register file with multiple read ports and one write port. The second VGPR introduces the ability to co-issue more than one instruction per clock cycle.

20 Claims, 15 Drawing Sheets

(51) Int. Cl.
  *G06F 9/38* (2018.01)
  *G06T 1/60* (2006.01)
(52) U.S. Cl.
  CPC ............ *G06F 2009/3883* (2013.01); *G06F 2209/548* (2013.01)

(56) References Cited

U.S. PATENT DOCUMENTS

| | | | |
|---|---|---|---|
| 10,929,944 | B2 | 2/2021 | Chen et al. |
| 2004/0078502 | A1 | 4/2004 | Hsin et al. |
| 2004/0187135 | A1 | 9/2004 | Pronovost et al. |
| 2007/0283131 | A1 | 12/2007 | Sagalovitch et al. |
| 2011/0050713 | A1 | 3/2011 | McCrary et al. |
| 2011/0268425 | A1 | 11/2011 | Glen |
| 2012/0139930 | A1 | 6/2012 | Rogers et al. |
| 2012/0188259 | A1 | 7/2012 | Hartog et al. |
| 2013/0155080 | A1 | 6/2013 | Nordlund et al. |
| 2013/0166877 | A1* | 6/2013 | Choquette ............ G06F 9/3012 712/E9.023 |
| 2013/0328891 | A1 | 12/2013 | Lyashevsky |
| 2013/0339978 | A1 | 12/2013 | Sander |
| 2014/0123144 | A1* | 5/2014 | Llamas .................. G06F 9/546 718/101 |
| 2014/0344821 | A1 | 11/2014 | Kini et al. |
| 2015/0187040 | A1 | 7/2015 | Rao et al. |
| 2015/0277981 | A1 | 10/2015 | Nalluri et al. |
| 2015/0293785 | A1 | 10/2015 | Murphy |
| 2015/0379667 | A1 | 12/2015 | Pendluru et al. |
| 2017/0024263 | A1* | 1/2017 | Verplanken ............ G06F 9/542 |
| 2017/0032486 | A1* | 2/2017 | Tseng ........................ G06T 1/20 |
| 2017/0255397 | A1* | 9/2017 | Jayasena ............... G06F 12/084 |
| 2018/0067894 | A1 | 3/2018 | Doi |

FOREIGN PATENT DOCUMENTS

| | | |
|---|---|---|
| JP | 2014532937 A | 12/2014 |
| KR | 20120058605 A | 6/2012 |

OTHER PUBLICATIONS

"White Paper: AMD Graphics Cores Next (GCN) Architecture", Advanced Micro Devices, Inc., Jun. 2012, 18 pages.

International Search Report and Written Opinion in International Application No. PCT/US2017/062039, dated Mar. 5, 2018, 10 pages.

Non-Final Office Action in Japanese Patent Application No. 2019-527900, dated Sep. 7, 2021, 7 pages.

Communication pursuant to Article 94(3) EPC in European Application No. 17817353.0, dated Nov. 23, 2021, 12 pages.

First Examination Report in Indian Patent Application No. 201917021995, dated Dec. 9, 2021, 7 pages.

Final Office Action in Japanese Patent Application No. 2019-527900, dated Jan. 11, 2022, 5 pages.

Office Action in Korean Patent Application No. 10-2019-7016762, dated Jul. 17, 2022, 14 pages.

\* cited by examiner

```
uint32 VGPR[32][4 * 256]; //32 thread, 4 bank, 256 each RAM void vgpr_index_read(int srcGprIndexVgpr, int dstDataVgpr)
{
for (int thread = 0; thread < 32; thread++){
    int index = vgpr[thread][srcGprIndexVgpr];
    VGPR[thread][dstDataVgpr] = vgpr[thread][index];
}} void vgpr_index_write(int srcDataVgpr, int dstGprIndexVgpr)
{
for (int thread = 0; thread < 32; thread++){
    int index = vgpr[thread][dstGprIndexVgpr];
    VGPR[thread][index] = vgpr[thread][srcDataVgpr];
}}
```

*FIG. 6*

```
uint32 VGPR[32][4 * 256]; //32 thread, 4 bank, 256 each RAM void vector_permute(int srcVgpr, int srcSelVGPR, int dstVGPR){
    uint32 srcData[32];
    uint32 srcSel[32];
    for (int thread = 0; thread < 32; thread++){
        srcData[thread] = VGPR[thread][srcVgpr];
        srcSel[thread] = VGPR[thread][srcSelVGPR];
    }
    for (int thread = 0; thread < 32; thread++){
        int sourceThread = (srcSel[thread]& 0x3FF);
        VGPR[thread][dstVGPR] = srcData[sourceThread];
    }
}
```

FIG. 8

LOW POWER AND LOW LATENCY GPU COPROCESSOR FOR PERSISTENT COMPUTING

CROSS REFERENCE TO RELATED APPLICATIONS

This application is a continuation of U.S. patent application Ser. No. 15/360,057, entitled "LOW POWER AND LOW LATENCY GPU COPROCESSOR FOR PERSISTENT COMPUTING", filed Nov. 23, 2016, the entirety of which is incorporated herein by reference.

BACKGROUND

Description of the Related Art

Parallel processing architectures do not scale well for certain applications. For example, ultra-low power applications which only require relatively limited compute ability with minimal parallel processing widths do not use parallel processing architectures in an efficient manner. In these applications, task allocation and scheduling overhead become significant compared to deployed computation resources. Some of these applications include network package processing, image recognition, audio processing, cryptography acceleration, and others. These applications typically require lower latency and persistent computing with steady input data flow and relatively rare processing kernel and state changes.

Some graphics processing unit (GPU) architectures and programming models involve a host or central processing unit (CPU) dispatching a batch of kernels to the GPU to finish many small tasks. The host is responsible for preparing the kernel's input data and for scheduling the tasks. However, some applications do not have immediately large input data sets, or the applications have input batches of small size which require fast real-time reaction with lower latency computing. Current GPU architectures and programming models do not work well for these applications.

BRIEF DESCRIPTION OF THE DRAWINGS

The advantages of the methods and mechanisms described herein may be better understood by referring to the following description in conjunction with the accompanying drawings, in which:

FIG. 6 illustrates one embodiment of pseudo code for vector general purpose register (VGPR) biased indexing.

FIG. 8 illustrates one embodiment of pseudo code for implementing the functionality of a crossbar.

DETAILED DESCRIPTION OF EMBODIMENTS

Figure 1:
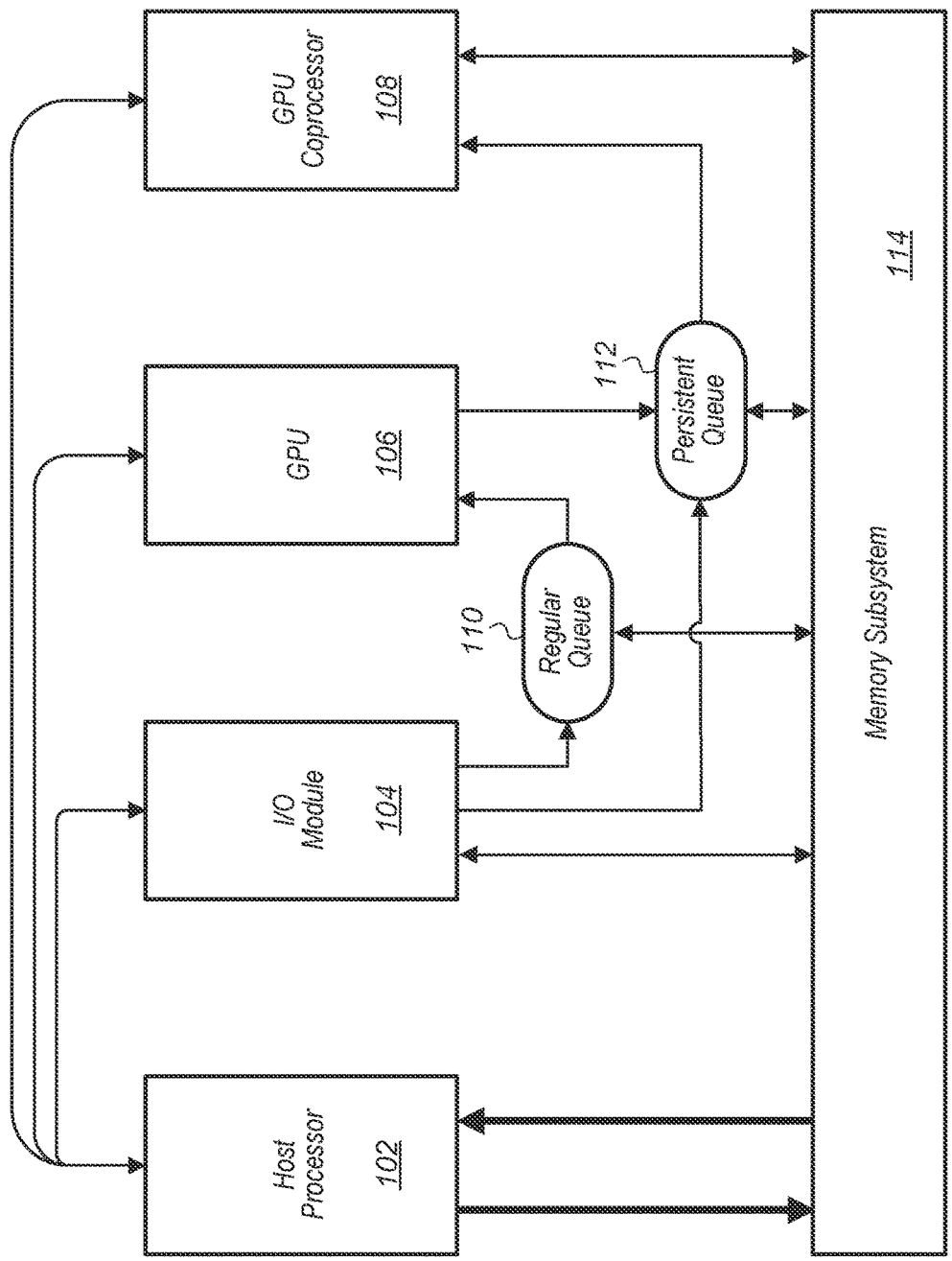
FIG. 1 is a block diagram of one embodiment of a computer system.

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, methods, and computer-readable mediums for implementing a graphics processing unit (GPU) coprocessor are disclosed. In one embodiment, a GPU coprocessor includes a single instruction, multiple data (SIMD) unit with the ability to self-schedule its own sub-wave procedures based on input data flow events. In one embodiment, the GPU coprocessor does not have a local data share (LDS) common memory unit shared by multiple SIMD units. Rather, the GPU coprocessor includes an inter-lane crossbar and intra-lane vector general purpose register (VGPR) biased indexing mechanism for the VGPR file(s).

In one embodiment, the VGPR file is split into two files. The first VGPR file is a larger register file with one read port and one write port. The second VGPR file is a smaller register file with multiple read ports and one write port. The second VGPR introduces the potential ability to issue more than one instruction per clock cycle. The GPU coprocessor is configured to convey multiple operands from the second VGPR file to the SIMD unit in a single clock cycle. Additionally, the first and second VGPR files are multi-bank arrays, and the GPU coprocessor is configured to access different word lines of separate banks of either VGPR file in a single clock cycle.

In one embodiment, a system includes a persistent queue, GPU, GPU coprocessor, input/output (I/O) module and a host processor. As used herein, the term "persistent queue" refers to a queue that stores data for persistent threads (as discussed later) or other persistent tasks and may be any of a variety of types of queues known in the art. The host processor and/or I/O module send messages targeting the GPU coprocessor to the persistent queue. The GPU coprocessor is configured to monitor the persistent queue status. In response to detecting a first message in the persistent queue, the GPU coprocessor performs a lookup of an event table for the first message. Next, the GPU coprocessor maps the first message to a first event using the event table. Then, the GPU coprocessor schedules a first sub-task for execution responsive to determining the first event specifies scheduling the first sub-task. The GPU coprocessor can then continue to service the next message and schedule the next sub-task in parallel if the SIMD compute resource (e.g., VGPR, sub-wave slots) is available.

In one embodiment, the GPU coprocessor detects a second message in the persistent queue and maps the second message to a second event using the event table. Next, the GPU coprocessor schedules a second sub-task for performing a matrix transpose operation on a first matrix responsive to mapping the second message to the second event and determining the second event specifies the second sub-task. To perform the second sub-task, the GPU coprocessor utilizes a crossbar to rotate data items in the first matrix to create a second matrix. Then, the GPU coprocessor utilizes multiple biased indexing operations to rearrange data items so as to create a third matrix, with the third matrix being a transposed version of the first matrix.

In one embodiment, the host processor schedules graphics processing tasks on the GPU for a video stream. The host processor sends messages to the GPU coprocessor to initiate audio processing tasks for the video stream. In one embodiment, the GPU coprocessor includes a scalar unit and a vector unit. The scalar unit is configured to monitor the persistent queue for messages and schedule sub-task procedures for execution on the vector unit responsive to mapping received messages to events using the event table.

Referring now to FIG. 1, a block diagram of one embodiment of a computer system 100 is shown. System 100 includes at least host processor 102, input/output (I/O) module 104, graphics processing unit (GPU) 106, GPU coprocessor 108, regular queue 110, persistent queue 112, and memory subsystem 114. It is noted that system 100 also includes other components which are not shown to avoid obscuring the figure.

Host processor 102 is coupled to I/O module 104, GPU compute unit 106, GPU coprocessor 108, and memory subsystem 114. Host processor 102 is representative of any number and type of processors (e.g., central processing unit (CPU)) with any number of cores. In one embodiment, host processor 102 is configured to execute the main control software of system 100, such as an operating system. Generally, software executed by host processor 102 during use can control the other components of system 100 to realize the desired functionality of system 100. Host processor 102 can also execute other software, such as application programs.

Host processor 102 is configured to manage the different types of compute nodes of system 100 including I/O module 104, GPU 106, and GPU coprocessor 108. GPU 106 receives input data from I/O module 104 via regular queue 110, and GPU 106 outputs data to persistent queue 112 for processing by GPU coprocessor 108. Persistent queue 112 also receives data from I/O module 104 directly. In various embodiments, persistent queue 112 is on a same semiconductor circuit device as the GPU, cache-based, or a virtually mapped queue managed by host processor 102.

I/O module 104 is representative of any number and type of I/O devices and/or I/O interfaces. For example, in one embodiment, I/O module 104 includes or is coupled to a camera. In one embodiment, I/O module 104 also includes or is coupled to other peripheral devices. In one embodiment, GPU 106 includes a plurality of compute units including single instruction multiple data (SIMD) units, a local data share (LDS) memory, and other components for supporting parallel processing tasks. In one embodiment, a SIMD unit is a pipeline, or programming model, where a kernel is executed concurrently on multiple processing elements each with its own data and a shared program counter. The processing elements execute an identical sequence of instructions. As referred to herein, a kernel is a function containing instructions declared in a program and executed on a compute unit. This function is also referred to as a shader, a shader program, or a program.

GPU coprocessor 108 is configured to execute persistent threads. As used herein, the term "persistent thread" is defined as a kernel that does not exit and is continually polling for work from a queue or other data structure. In other words, a persistent thread executes until its current task is complete and then checks for more data to process and/or tasks to perform. In one embodiment, GPU coprocessor 108 includes a single SIMD unit. GPU coprocessor 108 monitors persistent queue 112 for messages and maps these messages to events using a lookup table. GPU coprocessor 108 is configured to schedule sub-tasks for execution responsive to detecting messages in persistent queue 112.

Host processor 102, input/output (I/O) module 104, graphics processing unit (GPU) 106, and GPU coprocessor 108 are coupled to memory subsystem 114. In various embodiments, memory subsystem 114 includes one or more levels of caches and/or a main memory. Depending on the embodiment, various different types of memory devices are implemented as part of memory subsystem 114. These memory devices include (but are not limited to) dual in-line memory modules (DIMMs), random access memory (RAM), static RAM (SRAM), dynamic RAM (DRAM), Resistive RAM (ReRAM), Phase Change RAM (PCRAM), double data rate (DDR) DRAM, DDR2 DRAM, DDR3 DRAM, DDR4 DRAM, high-speed CMOS, high-density DRAM, eDRAM, 3D stacked memory (e.g., stacked DRAM), High Bandwidth Memory (HBM), interposer-based integrated memory, multi-chip modules (MCM), magneto-optical storage medium, read only memory (ROM), phase-change memory, spin-transfer torque magnetic RAM, memristor, extended data output (EDO) RAM, Rambus RAM, Rambus DRAM, erasable programmable memory (EEPROM), solid-state memory, hard disk drive, optical storage mediums, etc.

In one embodiment, host processor 102 initializes GPU coprocessor 108 and sets up a shader a single time. Then, the shader is executed indefinitely on GPU coprocessor 108 until host processor 102 notifies GPU coprocessor 108 to stop. The shader monitors persistent queue 112 for messages sent from host processor 102 to schedule different sub-tasks to be computed. A sub-task is defined as a process, thread, function, kernel, shader, or other sequence of instructions to be executed on a SIMD unit or other parallel processing unit. It is noted that the terms "sub-task" and "task" are used interchangeably herein.

System 100 can correspond to any of various types of computer systems or computing devices, including, but not limited to, a personal computer system, desktop computer, laptop or notebook computer, supercomputer, mobile device, tablet, phone, smartphone, mainframe computer system, handheld computer, workstation, network computer, a consumer device, server, file server, application server, storage server, web server, cloud computing server, or in general any type of computing system or device. It is noted that the number of components of system 100 can vary from embodiment to embodiment. There can be more or fewer of each component/subcomponent than the number shown in FIG. 1. It is also noted that system 100 can include other components not shown in FIG. 1. Additionally, in other embodiments, system 100 can be structured in other ways than shown in FIG. 1.

Figure 2:
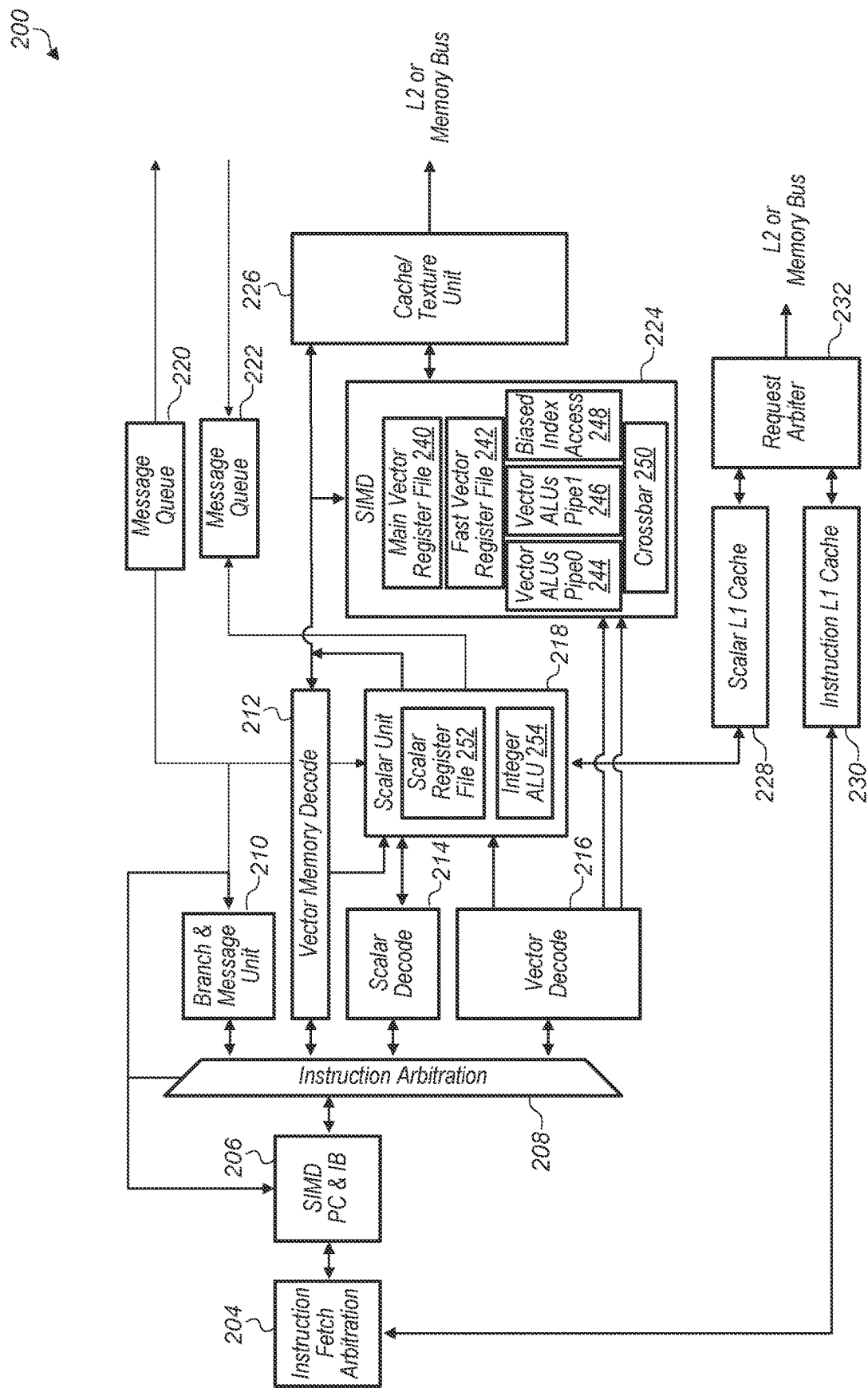
FIG. 2 is a block diagram of one embodiment of a GPU coprocessor unit.

Turning now to FIG. 2, a block diagram of one embodiment of a GPU coprocessor unit 200 is shown. In one embodiment, GPU coprocessor unit 200 is coupled to a host processor, GPU, an I/O block, persistent queue, and memory subsystem. GPU coprocessor unit 200 includes instruction fetch arbitration unit 204 coupled to instruction level one (L1) cache 230 for fetching instructions to execute. Instruction fetch arbitration unit 204 is coupled to SIMD program counter (PC) and instruction buffer (IB) 206 which buffers fetched instructions and is coupled to instruction arbitration unit 208.

Instruction arbitration unit 208 is coupled to branch and message unit 210, vector memory decode unit 212, scalar decode unit 214, and vector decode unit 216. Branch and message unit 210 is configured to decode branch instructions and messages (e.g., messages from a host processor, debug messages, synchronization messages). Message queue 220 is coupled to branch and message unit 210 and scalar unit 218 for conveying messages to these units. Vector memory decode unit 212 is configured to decode memory instructions. Scalar decode unit 214 is configured to decode instructions for execution on scalar unit 218, and vector decode unit 216 is configured to decode instructions for execution on single instruction, multiple data (SIMD) unit 224.

Scalar unit 218 is coupled to scalar L1 cache 228 for accessing data and/or instructions. Scalar L1 cache 228 is also coupled to request arbiter 232 which is coupled to a level two (L2) cache (not shown) or a main memory bus (not shown)). Scalar unit 218 includes scalar register file 252 and integer arithmetic logic unit (ALU) 254. In one embodiment, scalar unit 218 is configured to execute a sub-task scheduler, receive messages from the host processor (e.g., host processor 102 of FIG. 1), and send messages to the host processor. In one embodiment, a message received from the host processor triggers a sub-task procedure directly. Scalar unit 218 is configured to execute instructions on integer ALU 254 and access operands for these instructions in scalar register file 252. Scalar unit 218 is also coupled to message queue 222 and cache/texture unit 226. In one embodiment, scalar unit 218 generates a message when scalar unit 218 has finished processing a particular sequence of instructions and/or when scalar unit 218 is waiting on additional data to process.

SIMD unit 224 includes main vector register file 240, fast vector register file 242, vector ALU pipelines 244 and 246, biased index access mechanism 248, and crossbar 250. In one embodiment, main vector register file 240 has one read port and one write port, while fast vector register file 242 has multiple read ports and one write port. Additionally, in one embodiment, main vector register file 240 is larger than fast vector register file 242. Instructions are executed by SIMD unit 224 on vector ALU pipelines 244 or 246. One example of a SIMD unit architecture is illustrated and described in more detail below in FIG. 4.

SIMD unit 224 also includes biased index access mechanism 248 and crossbar 250. Biased index access mechanism 248 enables vector ALU pipelines 244 and 246 to access different word lines of register files 240 and 242 in the same clock cycle. Biased index access mechanism 248 allows certain operations (e.g., matrix transpose operations) to be performed efficiently by gathering data items within multiple rows of the matrix efficiently. Crossbar 250 enables permutations to be performed on the data accessed from register files 240 and 242 and on the result data generated by vector ALU pipelines 244 and 246. Crossbar 250 also allows for certain operations (e.g., matrix transpose operations) to be performed efficiently by rearranging data items within the matrix.

Cache/texture unit 226 is configured to store data for access by scalar unit 218 and SIMD unit 224. Cache/texture unit 226 is also coupled to another cache and/or a memory bus. It should be understood that GPU coprocessor unit 200 is one example of a GPU coprocessor unit architecture. In other embodiments, a GPU coprocessor unit includes other units and/or is structured in other suitable manners.

Figure 3:
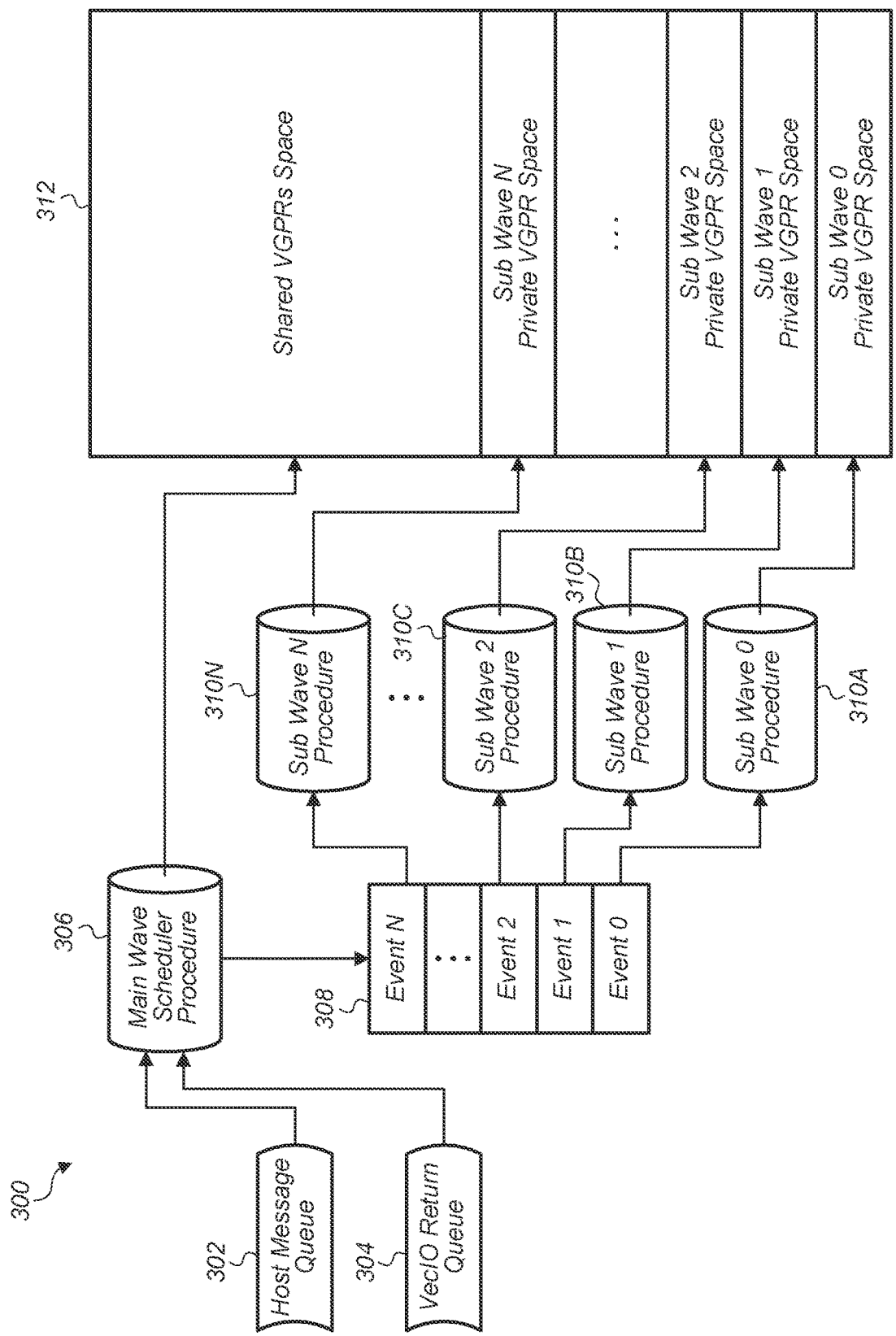
FIG. 3 is a block diagram of one embodiment of a shader kernel execution model for persistent computing.

Referring now to FIG. 3, a block diagram of one embodiment of a shader kernel execution model 300 for persistent computing is shown. The persistent shader execution model 300 has one main wave scheduler procedure 306 running continuously. The main wave scheduler procedure 306 is able to access all of the vector general purpose registers (VGPRs) 312 using a VGPR biased indexing mechanism (not shown). The scheduler 306 manages and schedules event-driven sub-waves based on incoming messages received in host message queue 302 or vector I/O return queue 304. An incoming message is a host message, I/O message, vector return signal, or other message.

In one embodiment, a message in queue 302 is mapped by scheduler 306 to an event using lookup table 308. The event is then used to start a corresponding sub wave procedure 310A-N. Depending on the embodiment, a single event or multiple event combinations invoke a sub-wave procedure. A private VGPR space is allocated for a new sub-wave procedure in VGPR 312. The sub-wave procedure is also able to access the shared VGPR space 312 using VGPR biased indexing operations. In one embodiment, scheduler 306 schedules instructions based on the priority of each sub-wave procedure 310A-N, and the scheduler 306 maintains data coherence and atomic operations across sub-waves. Once a sub-wave procedure 310A-N is finished, the private VGPR space allocated for that sub-wave is released and can be used by a new sub-wave procedure.

Figure 4:
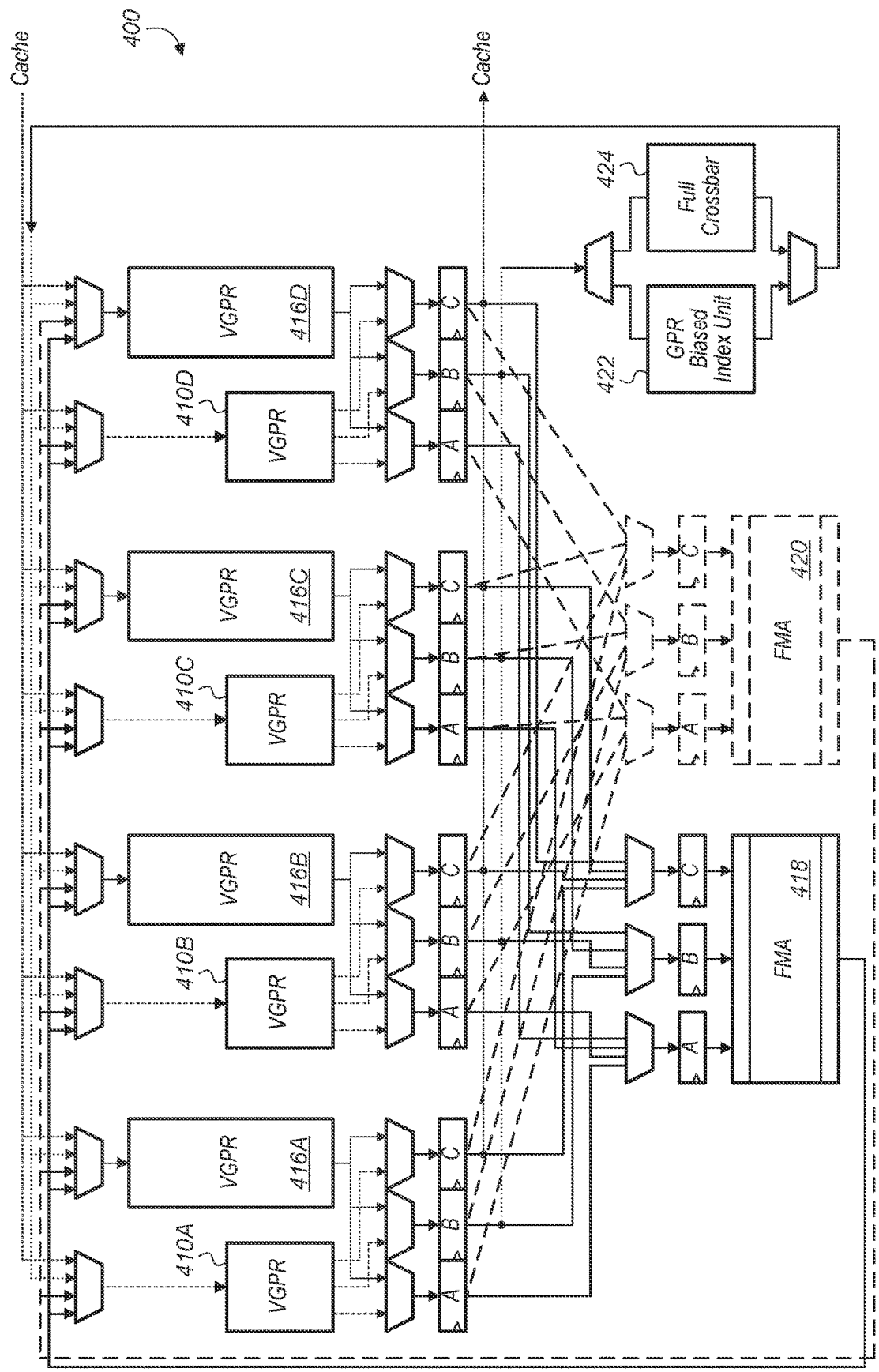
FIG. 4 is a block diagram of one embodiment of a SIMD unit.

Turning now to FIG. 4, a block diagram of one embodiment of a SIMD unit 400 is shown. In one embodiment, the circuitry of SIMD unit 400 is included in SIMD unit 224 (of FIG. 2). SIMD unit 400 includes fast VGPRs 410A-D, main VGPRs 416A-D, fused multiply add (FMA) units 418 and 420. Fast VGPRs 410A-D are representative of any number of fast VGPRs and main VGPRs 416A-D are representative of any number of main VGPRs which are implemented as part of SIMD unit 400. It is noted that while four VGPRs and four main VGPRs are shown in SIMD unit 400, in other embodiments, other numbers of fast VGPRs and main VGPRs are utilized. Additionally, other numbers of FMA units are utilized in other embodiments.

Multiple inputs are coupled to input multiplexers which feed fast VGPRs 410A-D and main VGPRs 416A-D. Logic within SIMD unit 400 is used to generate select signals to select which inputs to pass through these input multiplexers to fast VGPRs 410A-D and main VGPRs 416A-D. Inputs are coupled from a cache (not shown), the outputs of FMA units 418 and 420, and the output multiplexer connected to general purpose register (GPR) biased index unit 422 and full crossbar 424. In one embodiment, each fast VGPRs 410A-D has multiple read ports while each main VGPRs 416A-D has a single read port.

The read ports of fast VGPRs 410A-D and main VGPRs 416A-D are coupled through logic including multiplexers and flip-flops to FMA units 418 and 420. FMA units 418 and 420 are configured to select the appropriate inputs for executing the instructions for the persistent threads executing on SIMD unit 400. In one embodiment, each FMA unit 418 and 420 has multiple FMA units for performing multiple FMA operations per clock cycle.

Figure 5:
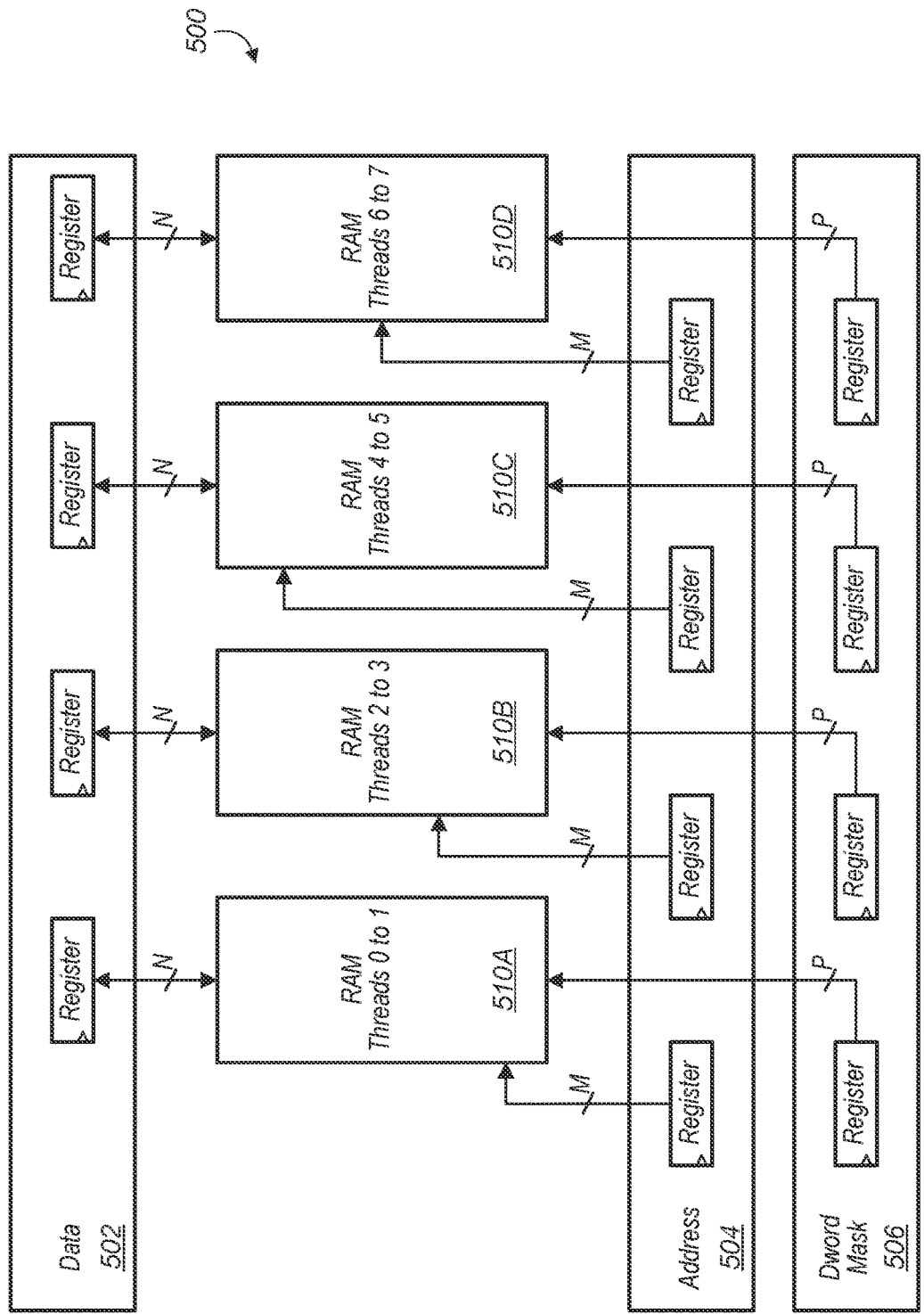
FIG. 5 is a block diagram of one embodiment of a vector register file to support biased indexing register operations.

Referring now to FIG. 5, a block diagram of one embodiment of a vector register file 500 is shown. In one embodiment, register file 500 includes four separate random-access memories (RAMs) 510A-D, a set of address flops 504 to hold different or biased addresses for each RAM, a set of data flops 502 to hold data, and a set of data word masks 506 to hold the read/write masks to RAMs 510A-N for even and odd lanes. Different word lines in the RAMs 510A-D are accessible in the same clock cycle. Accordingly, in a single clock cycle, an access to a first word line in RAM 510A is performed, an access to a second word line in RAM 510B is performed, an access to a third word line in RAM 510C is performed, and an access to a fourth word line in RAM 510D is performed, all in the same clock cycle, with the first, second, third, and fourth word lines being different word lines within RAMs 510A-D which is implemented with the help of a biased index unit (e.g., biased index unit 422 of FIG. 4).

The data width of each RAM 510A-D is N bits wide, with N a positive integer, and with N varying from embodiment to embodiment. The address width of each address flop 504 is M bits wide, with M a positive integer, and with M varying from embodiment to embodiment. Additionally, the width of each data word mask 506 is P bits wide, with P a positive integer, and with P varying from embodiment to embodiment. In one embodiment, a certain number of threads are assigned to each RAM 510A-D. For example, in one embodiment, two threads are assigned to use each RAM 510A-D. Accordingly, in this embodiment, threads 0 and 1 are assigned to RAM 510A, threads 2 and 3 are assigned to RAM 510B, threads 4 and 5 are assigned to RAM 510C, and threads 6 and 7 are assigned to RAM 510D. In other embodiments, other numbers of threads are assigned to use each RAM 510A-D.

Turning now to FIG. 6, one embodiment of pseudo code 600 for vector general purpose register (VGPR) biased indexing is shown. In one embodiment, an implementation of a vector register file on a GPU coprocessor uses multiple banks of random-access memories (RAMs). In this embodiment, each bank has one large VGPR with one read port and one write port, and each bank has one small VGPR with multiple read ports and one write port. Each RAM is able to be addressed at a different offset using a VGPR biased indexing scheme. In one embodiment, the VGPR biased indexing scheme is implemented using pseudo code 600.

For pseudo code 600, it is assumed that there are 32 threads and 4 banks for each RAM of the VGPR file. For a read from the VGPR file, first a read index is retrieved from a target register in the VGPR file. This read index identifies the location of the data being read from the VGPR file. Then the data is read from this identified location and stored in a target register. For a write to the VGPR file, first a write index is retrieved from a target register in the VGPR file. This write index identifies the location of where data is going to be written to the VGPR file. Then, the data is written to this identified location. Using the approach shown in pseudo code 600, any type of desired access pattern can be programmed in the indexes of VGPR file.

Figure 7:
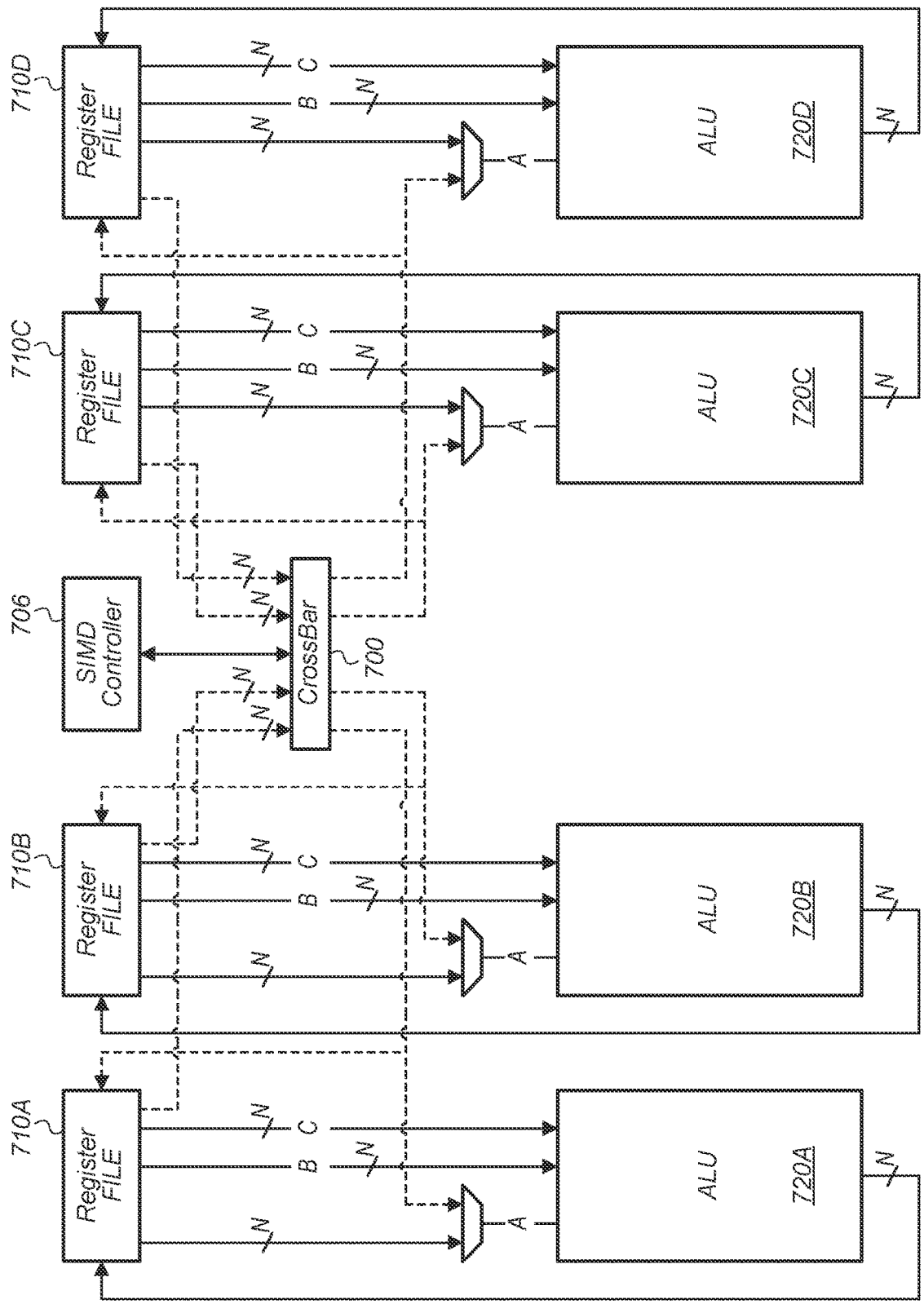
FIG. 7 is a block diagram of one embodiment of a crossbar.

Referring now to FIG. 7, a block diagram of one embodiment of a crossbar 700 is shown. Crossbar 700 is coupled to SIMD controller 706, register files 710A-D and ALUs 720A-D. Crossbar 700 is configured to permute data from the register files 710A-D so that any data items from register files 710A-D are able to be coupled to any of ALUs 720A-D. This allows the source "A" input of ALUs 720A-D to come from any of the register files 710A-D, facilitating the sharing of data between the different register files 710A-D and ALUs 720A-D. In one embodiment, the control signals for determining how data is routed from register files 710A-D to ALUs 720A-D via crossbar 700 are generated by SIMD controller 706 and conveyed to crossbar 700. The output of crossbar 700 is also coupled back to the write ports of register files 710A-D. The width of the various data paths is N bits, with N being a positive integer, and with N varying from embodiment to embodiment. In one embodiment, each ALU 720A-D includes multiple ALUs. For example, in one embodiment, each ALU 720A-D includes two ALUs.

Turning now to FIG. 8, one embodiment of pseudo code 800 for implementing the functionality of a crossbar is shown. The function "vector_permute" shown in pseudo code 800 is one example of an implementation of a crossbar (e.g., crossbar 700 of FIG. 7) within a GPU coprocessor. The crossbar receives as inputs data items from any of the register files, and the crossbar writes the input data items to selected locations of the register files and/or to the inputs of the various ALUs.

Figure 9:
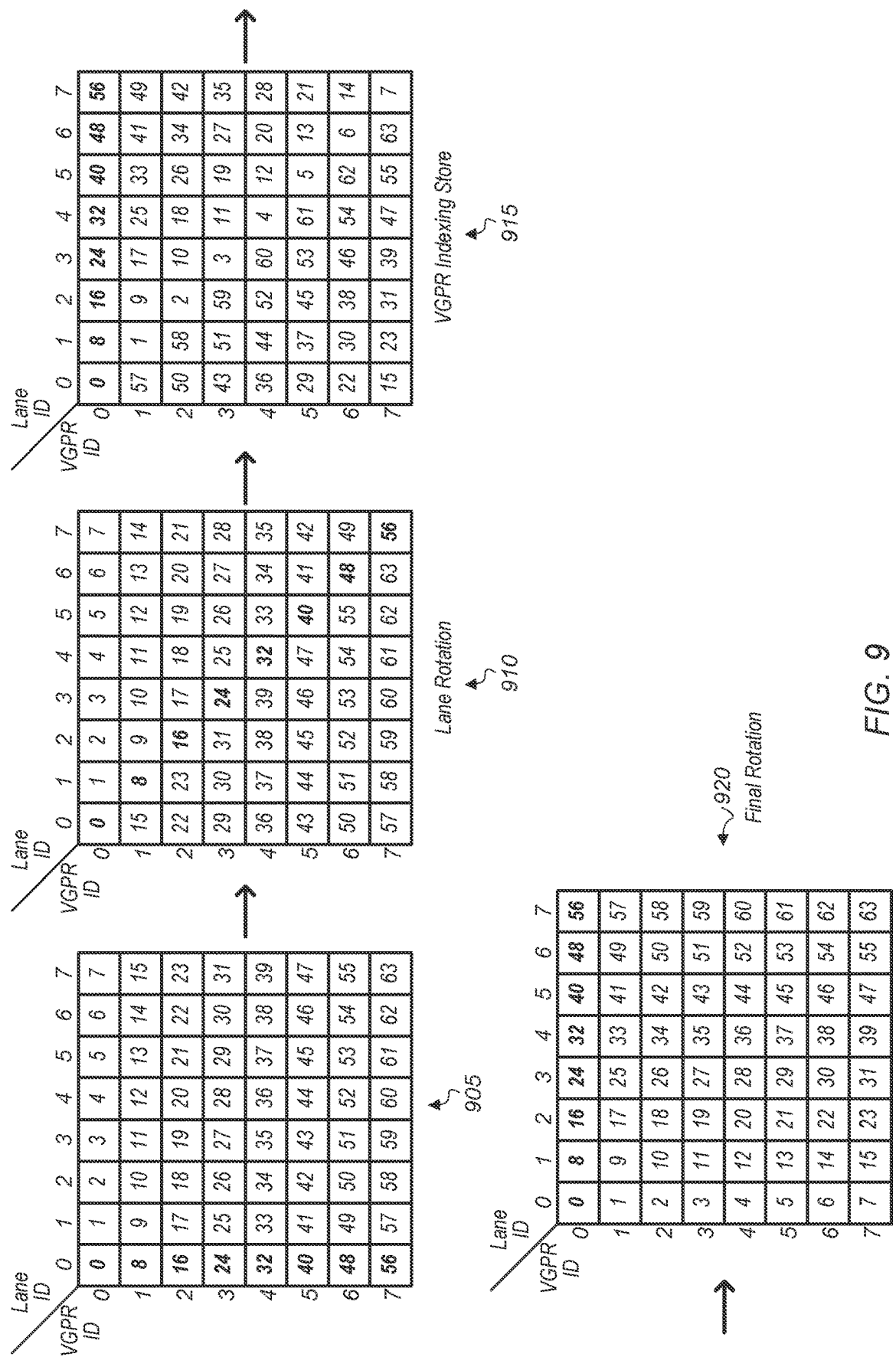
FIG. 9 is a block diagram of one embodiment of a matrix transposition operation.

Referring now to FIG. 9, a block diagram of one embodiment of a matrix transposition operation is shown. In one embodiment, a matrix transposition is performed by a GPU coprocessor (e.g., GPU coprocessor 200 of FIG. 2) using VGPR biased indexing and crossbar functionality. The initial matrix layout 905 is shown on the left-side of FIG. 9. It is assumed for the purposes of this discussion that the matrix being transposed is an 8×8 matrix. In other embodiments, other sizes of matrices are transposed.

In a first sequence of operations, the data items of VGPR index 0 are kept unchanged, the data items in VGPR index 1 are rotated from left to right by one item using the crossbar (e.g., crossbar 700 of FIG. 7), the data items in VGPR index 2 are rotated from left to right by two items using the crossbar, the data items in VGPR index 3 are rotated from left to right by three items using the crossbar, and so on. After these 7 operations, the result is shown as matrix 910 in the middle of FIG. 9.

In a second sequence of operations, VGPR biased indexing is utilized to load matrix elements 0, 8, 16, 24, 32, 40, 48, and 56 from VGPR indexes 0, 1, 2, 3, 4, 5, 6, and 7 to VGPR 0 lanes 0, 1, 2, 3, 4, 5, 6, and 7, respectively. Then similar biased indexing operations are performed for the other diagonally arranged data items of matrix 910. The pre-resultant matrix 915 is shown on the right-side of FIG. 9. In a third set of operations, another seven row rotation operation is performed to generate the final resultant matrix 920. In total, seven crossbar operations, eight biased indexing operations, and then another seven crossbar operations are performed to complete the 8×8 matrix transposition.

Figure 10:
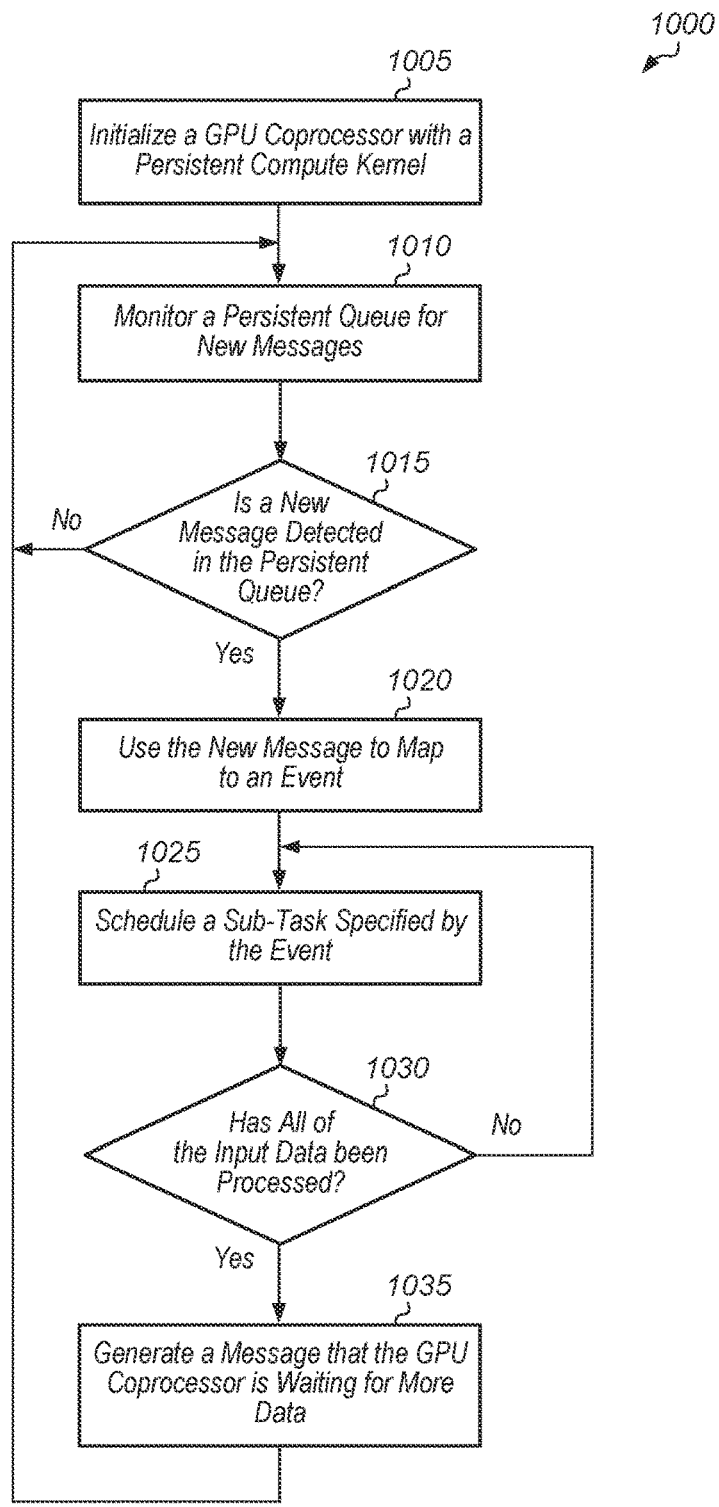
FIG. 10 is a generalized flow diagram illustrating one embodiment of a method for executing a persistent compute kernel on a GPU coprocessor.

Turning now to FIG. 10, one embodiment of a method 1000 for executing a persistent compute kernel on a GPU coprocessor is shown. For purposes of discussion, the steps in this embodiment and those of FIGS. 11-15 are shown in sequential order. However, it is noted that in various embodiments of the described methods, one or more of the elements described are performed concurrently, in a different order than shown, or are omitted entirely. Other additional elements are also performed as desired. Any of the various systems or apparatuses described herein are configured to implement method 1000.

A GPU coprocessor is initialized with a persistent compute kernel (block 1005). Next, the GPU coprocessor monitors a persistent queue for new messages (block 1010). If the persistent compute kernel detects a new message in the persistent queue (conditional block 1015, "yes" leg), then the GPU coprocessor uses the new message to map to an event (block 1020). In one embodiment, the message also indicates that there is data for the GPU coprocessor to process. Next, the GPU coprocessor schedules a sub-task specified by the event (block 1025). If the persistent compute kernel does not detect a new message in the persistent queue (conditional block 1015, "no" leg), then method 1000 returns to monitor block 1010.

If all of the input data has been processed by the sub-task (conditional block 1030, "yes" leg), then the GPU coprocessor generates a message that the GPU coprocessor is waiting for more data (block 1035). After block 1035, method 1000 returns to block 1010. If not all of the input data has been processed by the GPU coprocessor (conditional block 1030, "no" leg), then method 1000 returns to schedule block 1025.

Figure 11:
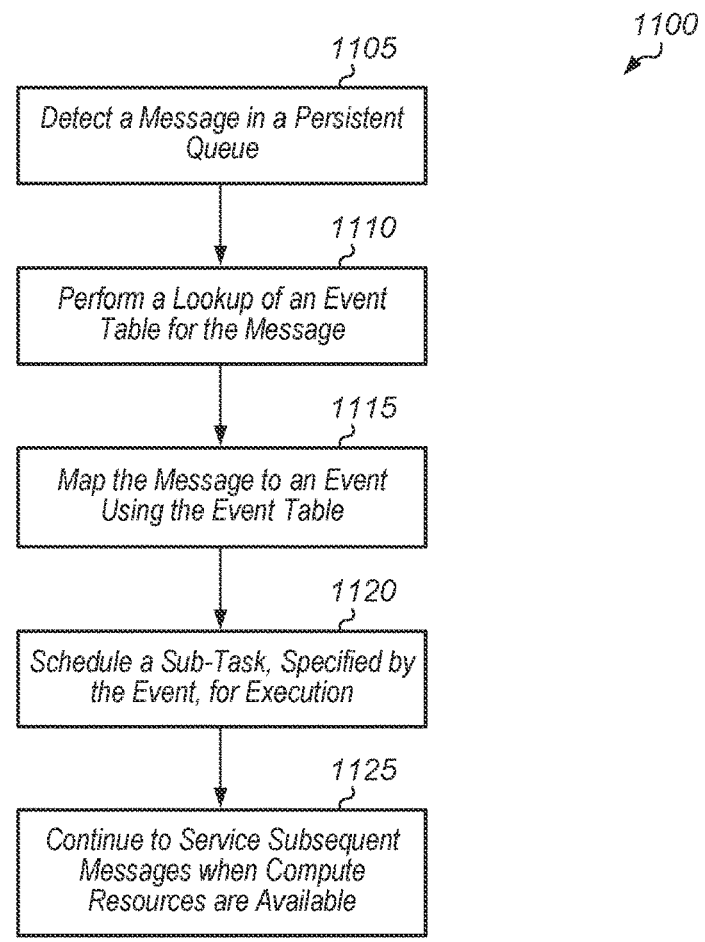
FIG. 11 is a generalized flow diagram illustrating another embodiment of a method for processing a message in a persistent queue.

Referring now to FIG. 11, one embodiment of a method 1100 for processing a message in a persistent queue is shown. A GPU coprocessor detects a message in a persistent queue (block 1105). In response to detecting the message, the GPU coprocessor performs a lookup of an event table for the message (block 1110). The GPU coprocessor maps the message to an event using the event table (block 1115). Then, the GPU coprocessor schedules a sub-task, specified by the event, for execution (block 1120). Next, the GPU coprocessor continues to service subsequent messages when compute resources are available. After block 1125, method 1100 ends.

Figure 12:
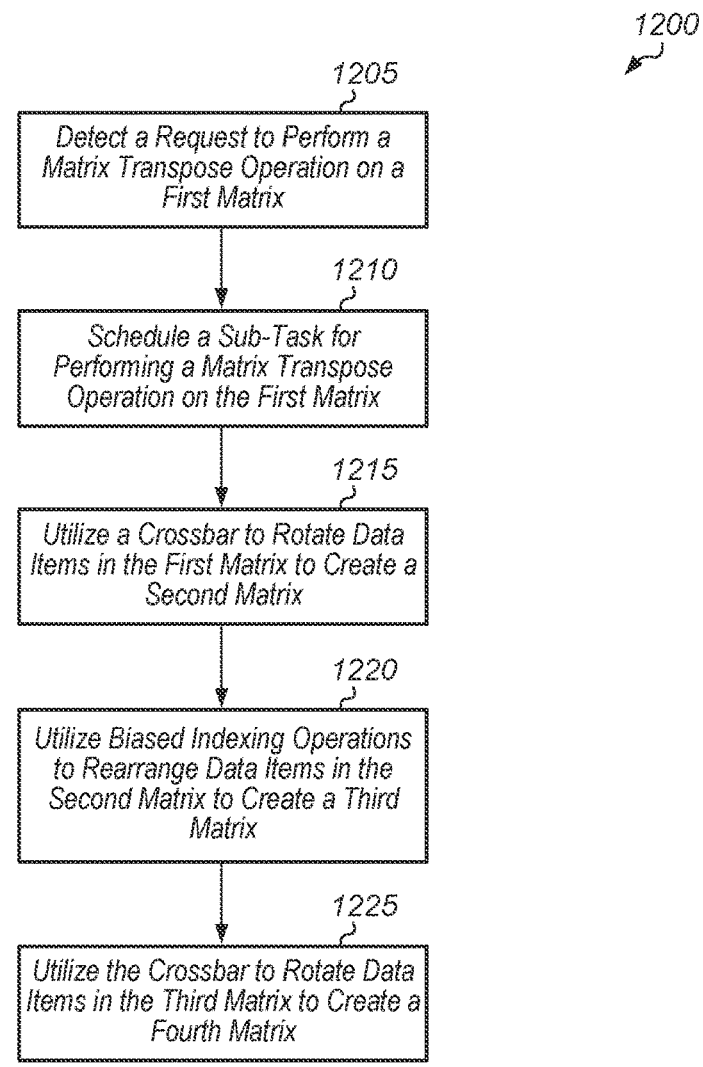
FIG. 12 is a generalized flow diagram illustrating one embodiment of a method for performing a matrix transpose operation.

Turning now to FIG. 12, one embodiment of a method 1200 for performing a matrix transpose operation is shown. A GPU coprocessor detects a request for performing a matrix transpose operation on a first matrix (block 1205). In response to detecting the request, the GPU coprocessor schedules a sub-task for performing a matrix transpose operation on the first matrix (block 1210). In one embodiment, the first matrix is stored in one or more VGPR files of the GPU coprocessor.

The GPU coprocessor utilizes a crossbar to rotate data items in the first matrix to create a second matrix (block 1215). It is noted that the second matrix is a temporary arrangement of data items which is generated as part of the matrix transpose operation. Next, the GPU coprocessor utilizes biased indexing operations to rearrange data items in the second matrix to create a third matrix, with the third matrix a transposed version of the first matrix (block 1220). Then the GPU coprocessor utilizes the crossbar to rotate data items of the third matrix to create a fourth matrix (block 1225). After block 1225, method 1200 ends.

Figure 13:
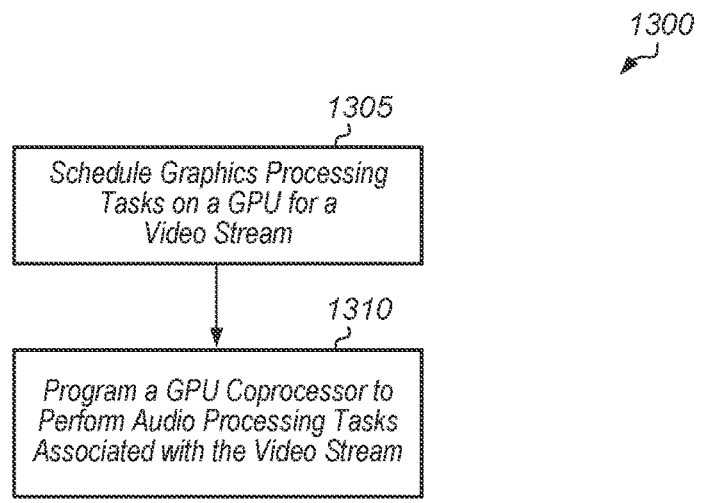
FIG. 13 is a generalized flow diagram illustrating one embodiment of a method for audio processing associated with a video stream.

Referring now to FIG. 13, one embodiment of a method 1300 for audio processing associated with a video stream is shown. A host processor schedules graphics processing tasks on a GPU for a video stream (block 1305). The host processor programs a GPU coprocessor to perform audio processing tasks associated with the video stream (block 1310). After block 1310, method 1300 ends.

Figure 14:
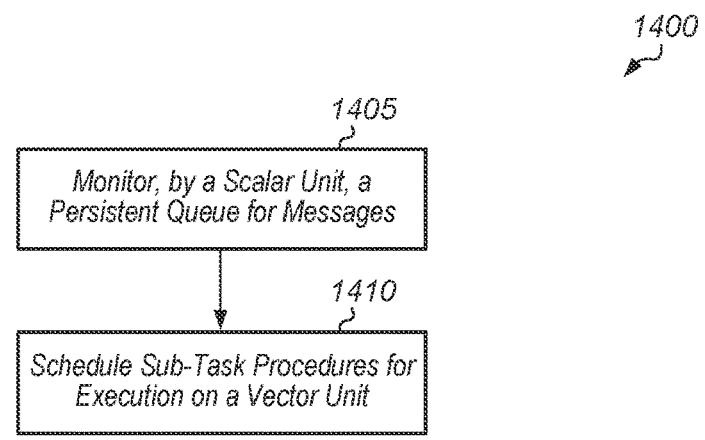
FIG. 14 is a generalized flow diagram illustrating another embodiment of a method for operating a GPU coprocessor.

Turning now to FIG. 14, one embodiment of a method 1400 for operating a GPU coprocessor is shown. In one embodiment, a GPU coprocessor includes at least a scalar unit and a vector unit. In one embodiment, the vector unit is a SIMD unit. The scalar unit monitors a persistent queue for messages (block 1405). The scalar unit schedules sub-task procedures for execution on the vector unit (block 1410). For example, responsive to detecting a first message, the scalar unit schedules a first sub-task procedure for execution on the vector unit. After block 1410, method 1400 ends.

Figure 15:
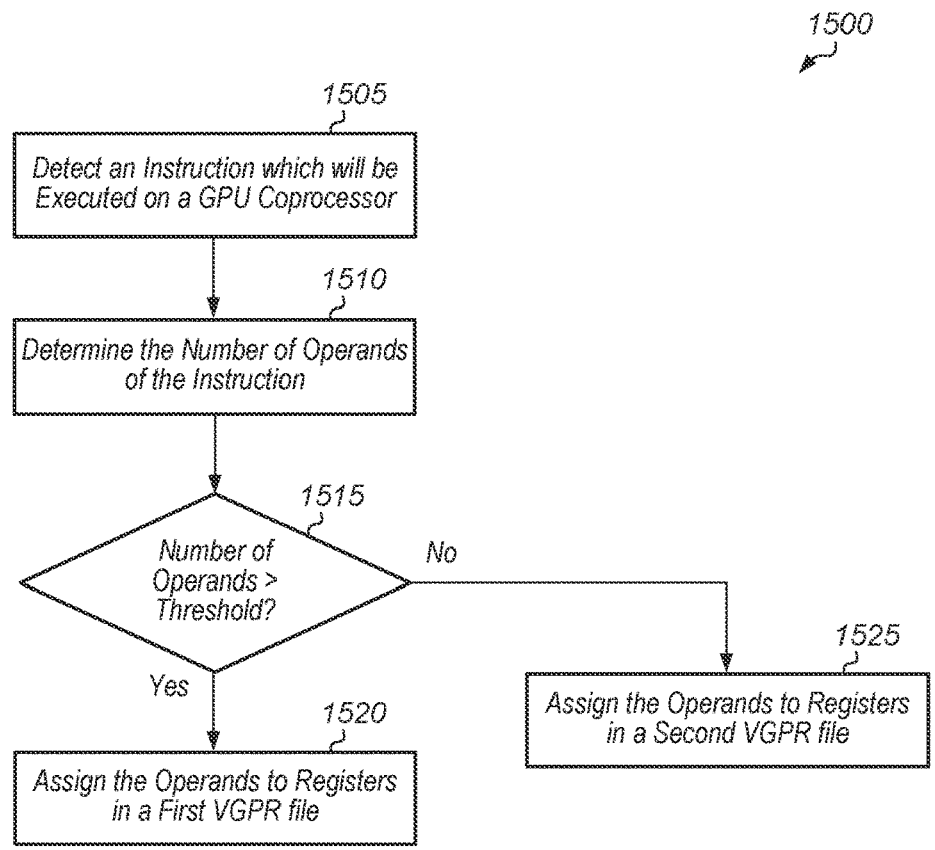
FIG. 15 is a generalized flow diagram illustrating one embodiment of a method for assigning operands to different vector general purpose register (VGPR) files.

Referring now to FIG. 15, one embodiment of a method 1500 for assigning operands to different vector general purpose register (VGPR) files is shown. A compiler detects an instruction which will be executed on a GPU coprocessor (block 1505). The compiler determines the number of operands of the instruction (block 1510). If the number of operands of the instruction is greater than a threshold (conditional block 1515, "yes" leg), then the compiler assigns the operands to registers in a first VGPR file (block 1520). In one embodiment, the first VGPR file has multiple read ports. In one embodiment, the threshold is two. In other embodiments, the threshold is other numbers. Otherwise, if the number of operands of the instruction is less than or equal to the threshold (conditional block 1515, "yes" leg), then the compiler assigns the operands to registers in a second VGPR file (block 1525). It may be assumed for the purposes of this discussion that the second VGPR file is different from the first VGPR file. In one embodiment, the second VGPR file has a single read port, and the second VGPR file has more storage capacity than the first VGPR file. After blocks 1520 and 1525, method 1500 ends.

In various embodiments, program instructions of a software application are used to implement the methods and/or mechanisms previously described. The program instructions describe the behavior of hardware in a high-level programming language, such as C. Alternatively, a hardware design language (HDL) is used, such as Verilog. The program instructions are stored on a non-transitory computer readable storage medium. Numerous types of storage media are available. The storage medium is accessible by a computing system during use to provide the program instructions and accompanying data to the computing system for program execution. The computing system includes at least one or more memories and one or more processors configured to execute program instructions.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. An apparatus comprising:
    a first compute unit comprising a plurality of single instruction multiple data (SIMD) units; and
    a second compute unit comprising only one SIMD unit;
        wherein the second compute unit comprises circuitry configured to:
            continuously execute a given thread which monitors a queue for messages; and
            schedule a task for execution by the first compute unit, responsive to detecting a message in the queue.

2. The apparatus as recited in claim 1, wherein the given thread corresponds to a persistent compute kernel.

3. The apparatus as recited in claim 2, wherein the second compute unit is further configured to:
    perform a lookup of an event table using the message; and
    schedule the task for execution, responsive to determining the event table maps the message to a given event that identifies the task.

4. The apparatus as recited in claim 2, wherein the second compute unit is configured to:
    allocate private vector register space with operands stored in the queue to be used by the first compute unit when executing the task.

5. The apparatus as recited in claim 4, wherein the second compute unit is configured to:
release the allocated private vector register space responsive to determining the first compute unit has finished executing the task.

6. The apparatus as recited in claim 2, wherein to set up the first compute unit, the second compute unit is further configured, independent of any external processor by executing the persistent compute kernel, to:
fetch a sequence of instructions of the task; and
send the instructions to the first compute unit for execution.

7. The apparatus as recited in claim 6, wherein the second compute unit is further configured to issue more than one instruction in a single clock cycle to the first compute unit.

8. A method comprising:
continuously executing, by a first compute unit comprising only one single instruction multiple data (SIMD) unit, a given thread which monitors a queue for messages; and
scheduling, by the first compute unit, a task for execution by a second compute unit comprising a plurality of SIMD units, responsive to detecting a message in the queue.

9. The method as recited in claim 8, the given thread corresponds to a persistent compute kernel.

10. The method as recited in claim 9, further comprising:
performing, by the first compute unit, a lookup of an event table using the message; and
scheduling, by the first compute unit, the task for execution by the second compute unit, responsive to determining the event table maps the message to a given event that identifies the task.

11. The method as recited in claim 9, further comprising:
allocating, by the first compute unit, private vector register space with operands stored in the queue to be used by the SIMD unit when executing the task.

12. The method as recited in claim 11, further comprising:
releasing, by the first compute unit, the allocated private vector register space responsive to determining the second compute unit has finished executing the task.

13. The method as recited in claim 9, wherein to set up the second compute unit, the method further comprises:
fetching, by the first compute unit, a sequence of instructions of the procedure task; and
sending, by the first compute unit, the instructions to the second compute unit for execution.

14. A system comprising:
a graphics processing unit (GPU) comprising a plurality of single instruction multiple data (SIMD) units;
a GPU coprocessor comprising only one SIMD unit; and
a host processor configured to set up the GPU coprocessor with a persistent compute kernel, wherein the GPU coprocessor comprises circuitry to continuously execute the persistent compute kernel until receiving a notification to stop executing the persistent compute kernel;
wherein the persistent compute kernel is configured to:
monitor a queue for messages; and
schedule a task for execution by the GPU, responsive to detecting a message in the queue.

15. The system as recited in claim 14, wherein the notification to stop executing the persistent compute kernel is from the host processor.

16. The system as recited in claim 15, wherein:
the GPU coprocessor is further configured, to:
perform a lookup of an event table using the message; and
schedule the task for execution, responsive to determining the event table maps the message to a given event that identifies the task.

17. The system as recited in claim 15, wherein the GPU coprocessor is further configured to:
allocate private vector register space with operands stored in the queue to be used by the GPU when executing the task.

18. The system as recited in claim 17, wherein the GPU coprocessor is further configured, independent of the host processor by executing the persistent compute kernel, to:
release the allocated private vector register space responsive to determining the GPU has finished executing the task.

19. The system as recited in claim 15, wherein to set up the GPU, the GPU coprocessor is further configured, independent of the host processor by executing the persistent compute kernel, to:
fetch a sequence of instructions of the task; and
send the instructions to the GPU for execution.

20. The system as recited in claim 19, wherein the GPU coprocessor is further configured to issue more than one instruction in a single clock cycle to the GPU.

* * * * *

UNITED STATES PATENT AND TRADEMARK OFFICE
CERTIFICATE OF CORRECTION

PATENT NO. : 11,625,807 B2
APPLICATION NO. : 17/181300
DATED : April 11, 2023
INVENTOR(S) : Chen et al.

It is certified that error appears in the above-identified patent and that said Letters Patent is hereby corrected as shown below:

In the Claims

Column 11, Claim 13, Line 45, please delete "of the procedure task;" and insert -- of the task; --.

Signed and Sealed this
Third Day of October, 2023

Katherine Kelly Vidal
*Director of the United States Patent and Trademark Office*